THE IRON AGE CATALOGUE
of AMERICAN EXPORTS

The Standardized Coöperative WORLD-WIDE
Export Catalogue of United States Manufacturers

ENGLISH
INDEX ON
PAGE 9

IRON
STEEL
MACHINERY
TOOLS

HARDWARE AND CUTLERY
SANITARY EQUIPMENT
AGRICULTURAL IMPLEMENTS

INDICE
ESPAÑOL
EN
LA PÁGINA 19

CATALOGO MUNDIAL

INDICE
PORTUGUEZ
PAGINA 29

CATALOGO MUNDIAL

INDEX
FRANÇAIS
PAGE 39

CATALOGUE MONDIAL

W. D. GREGORY.
CATALOGUE.
APPLICATION FILED JUNE 30, 1919.

1,319,386.

Patented Oct. 21, 1919.
4 SHEETS—SHEET 2.

18 — ENGLISH Products-Index — Page 9

19
ACCUMULATORS
Elmes, Chas. F., Eng. Wks., 334.
Garrison, A., Foundry Co., 340.
20
AGRICULTURAL IMPLEMENTS BRASS SPECIALTIES — 19
American Brass Products Co., 1000
Betz-Pierce Co. 1008
20

Fig. 2.

18 — Indice en Español de los Productos — Page 19

19
ACUMULADORES
Elmes, Chas. F., Eng. Wks., 334
Garrison, A., Foundry Co., 340
Metalwood Mfg. Co., 394
ADOBE DE CORREAJE — 20
Chicago Belting Co., 456.

MAQUINARIA PARA HACER PERNOS Y TUERCAS

MAQUINAS PARA DOBLAR — 19
American Pipe Bending Machine Co., 300.
20

Fig. 3.

18 — Indice dos Productos in Portuguez — Page 29

19
ACCUMULADORES
Elmes, Chas. F., Eng. Wks., 334 — 20
Garrison, A., Foundry Co., 340
Metalwood Mfg. Co., 391.
AUTOMOVEIS LAMPADAS — 19
(Oleo)

Fig. 4.

INVENTOR
W. D. Gregory
BY
ATTORNEY

W. D. GREGORY.
CATALOGUE.
APPLICATION FILED JUNE 30, 1919.

1,319,386.

Patented Oct. 21, 1919.
4 SHEETS—SHEET 3.

*18* —Index de Produits en Français — Page 39

ACCUMULATEURS
Elmes, Chas. F., Eng. Wks., 334
Garrison, A., Foundry Co., 340.
Metalwood Mfg. Co., 394.

19   20

AGRAFFES POUR COURROIES

MACHINES POUR PLIER
American Pipe Bending Machine Co. 300.

Fig. 5.

*18* — УКАЗАТЕЛЬ ЗАВОДОВЪ — Page 49

АВТОМОБИЛИ
Chandler Motor Car Co., 1200.
Davis Motor Car Co., 1216.
Dort Motor Car Co., 1221.

19   20

АВТОМОБИЛЬНЫЯ ПРИНАДЛЕЖ-
НОСТИ

РЕМНИ — *19*
Цѣпи   20
Link-Belt Co., 476.

Fig. 6.

Page 1500

INTERPRETATIVE SECTION

COMPANIA DE MAQUINAS PARA TALLER MECANICO
"MONARCH"
MONARCH MACHINE TOOL CO.
SIDNEY, OHIO, U.S.A.
Dirección Cablegráfica: "Monarch," Sidney
Código en la Página 18.
PRODUCTOS—TORNOS MECANICOS.
CAPACIDAD—

DESCRIPCION DEL

SERVICIO Y COSTO—

TRANSMISION POR

UTILIDAD—

Fig. 8.

INVENTOR
W. D. Gregory
BY
ATTORNEY

W. D. GREGORY.
CATALOGUE.
APPLICATION FILED JUNE 30, 1919.

1,319,386.

Patented Oct. 21, 1919.
4 SHEETS—SHEET 4.

Page 450 — MONARCH MACHINE TOOL CO.
SIDNEY, OHIO, U.S.A.
Manufacturers of Engine Lathes

FOREIGN BRANCHES

| | | | |
|---|---|---|---|
| London | Copenhagen | Melbourne | Buenos Aires |
| Paris | Stockholm | Aukland, N. Z. | Rio de Janeiro |
| Liège | Christiania | Barcelona | Mexico City |
| Lisbon | Brussels | Milan | Havana |

Products
 Engine Lathes

Capacity
 The capacity of our plant is 2500 lathes annually. In 1918 a portion of this output was sold to the United States and the Allies for all kinds of government work.

Service and Cost
 Through quantity production and by devot-

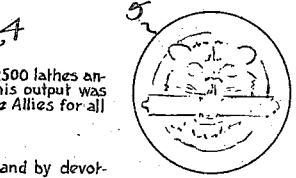
TRADE MARK

Steel Rack —
Carriage and Apron —

Proof of Accuracy
 Every Monarch Lathe

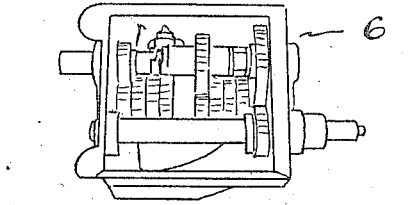
FIG. 2.— INSIDE VIEW OF QUICK CHANGE GEAR BOX.

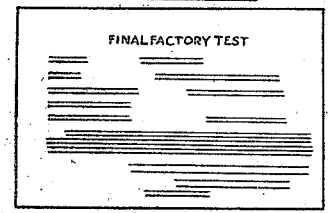
FINAL FACTORY TEST

FIG. 1.— FACSIMILE OF FACTORY TEST CARD

Traduccion espanola en la pagina 1500
La traduction francaise a la page 1501
Traduccao portugueza na pagina 1500
РУССКІЙ ПЕРЕВОДЪ НА СТР. 1501

Fig. 7.

INVENTOR
W. D. Gregory
BY
ATTORNEY

UNITED STATES PATENT OFFICE.

WALTER D. GREGORY, OF NEWARK, NEW JERSEY, ASSIGNOR, BY MESNE ASSIGNMENTS, TO UNITED PUBLISHERS CORPORATION, OF NEW YORK, N. Y., A CORPORATION OF DELAWARE.

CATALOGUE.

1,319,386.   Specification of Letters Patent.   Patented Oct. 21, 1919.

Application filed June 30, 1919. Serial No. 307,513.

*To all whom it may concern:*

Be it known that I, WALTER D. GREGORY, a citizen of the United States, and a resident of Newark, in the county of Essex and State of New Jersey, have invented a new and useful Improvement in Catalogues, of which the following is a specification.

The object is to provide a catalogue of domestic manufacturers and their products capable of being used by purchasers the world over irrespective of language. The body of the catalogue, in accordance with the invention, is printed in one language, that is to say, English, the language of the exporting country, combined with which body is a multiple index in the languages of the various importing countries, so that a prospective customer anywhere can readily find the subject-matter in which he may be interested. An interpretative section of the book contains matter in one or more foreign languages relating to corresponding portions of the body, according to the desires of the manufacturers; and there are references on pages of the body to the corresponding pages of the interpretative section. In the absence of interpretative matter the intending purchaser finds in the body, by aid of the multilingual index, the names and addresses of the concerns with whom he may desire to correspond, and cuts of their machinery or apparatus, and if he possesses a slight knowledge of English can gain a sufficient understanding of the text for his purpose, or he can call in a translator to render the small portion of the book in which he is interested.

In the accompanying drawings illustrating the invention and forming a part hereof:

Figure 1 represents a cover page of the book;

Figs. 2, 3, 4, 5 and 6 represent portions of pages of the index section;

Fig. 7 represents a page from the body of the book; and

Fig. 8 represents a portion of a page of the interpretative section.

Only a portion of the text in each instance is represented by lettering.

The pages of the body of the catalogue (see Fig. 7) contain printing in English, giving, in the case of each of the domestic manufacturers listed therein, the name 1, the address or addresses 2, the general nature 3 of the goods, and reading matter 4 descriptive thereof. In addition, and according to the nature of the case, there appear cuts, as 5, 6, 7, showing trade-mark, apparatus, etc. The lines 1, 2 and 3 are prominently displayed.

The body of the book is made up of a large number of pages of this character. The index section comprises a plurality of complete indexes, each in a different language. References to these indexes, giving their page numbers, appear upon the front cover (Fig. 1), as indicated at 8, 9, 10, 11 and 12, associated with which, in the respective languages, are statements 13, 14, 15, 16 and 17 of the scope of the catalogue. Thus the importer can turn at once to the proper section of the index, and from thence to the part of the body that he may desire. Pages from the index are illustrated in Figs. 2 to 6, where, in each case, 18 is the index title, 19 are the products headings, and 20 the names of manufacturers thereunder with the page numbers where they appear. The character of the index may, of course, be varied.

In addition, the book contains in a separate part an interpretative section, of which a portion of a page is represented in Fig. 8. This section may embrace more or less of the matter of the body, and may be condensed or not, according to the wishes of the manufacturers, and any one portion of the body may have a corresponding interpretative portion in one foreign language or portions in a plurality of languages, as may be deemed desirable. Thus, near the bottom of the body page shown in Fig. 7 are references 21, 22, 23 and 24 to four portions of the interpretative section, in as many different languages.

It will be understood, of course, that the invention is not limited to the number of languages used. Those indicated are English, Spanish, Portuguese, French and Russian, to which others may be added.

What I claim as new is:

1. A catalogue having the pages of its body printed in one language giving the names and addresses of concerns and matter descriptive of their products, and in combination therewith a multiple index section comprising a plurality of complete indexes in different languages referring to the pages of the body, whereby a single standardized catalogue is made universally available.

2. A catalogue having the pages of its body printed in one language giving the names and addresses of concerns and matter descriptive of their products, a multiple index section comprising a plurality of complete indexes in different languages referring to the pages of the body, an interpretative section containing matter in the languages of the index relating to certain portions of the body, and references upon the pages of such portions of the body to the corresponding pages of the interpretative section.

WALTER D. GREGORY.